(12) United States Patent
Ogawa

(10) Patent No.: US 9,674,463 B2
(45) Date of Patent: *Jun. 6, 2017

(54) IMAGE PROCESSING APPARATUS, IMAGE PICKUP APPARATUS HAVING THE SAME, AND IMAGE PROCESSING METHOD

(71) Applicant: CANON KABUSHIKI KAISHA, Tokyo (JP)

(72) Inventor: Takeshi Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,737

(22) Filed: Jul. 16, 2015

(65) Prior Publication Data

US 2015/0319371 A1    Nov. 5, 2015

Related U.S. Application Data

(62) Division of application No. 13/859,174, filed on Apr. 9, 2013, now Pat. No. 9,113,070.

(30) Foreign Application Priority Data

Apr. 27, 2012    (JP) .................................. 2012-102880

(51) Int. Cl.
*H04N 5/265* (2006.01)
*H04N 5/232* (2006.01)
*H04N 5/225* (2006.01)

(52) U.S. Cl.
CPC ........... *H04N 5/265* (2013.01); *H04N 5/2254* (2013.01); *H04N 5/23212* (2013.01); *H04N 5/23229* (2013.01)

(58) Field of Classification Search
None
See application file for complete search history.

(56) References Cited

U.S. PATENT DOCUMENTS 5,235,428 A * 8/1993 Hirota ................ H04N 5/23212
    348/355
8,212,892 B2   7/2012 Yamazaki
(Continued)

FOREIGN PATENT DOCUMENTS

CN         1606337 A    4/2005
CN       101534447 A    9/2009
(Continued)

OTHER PUBLICATIONS

Chinese Official Action dated Dec. 30, 2015, issued in corresponding Chinese Patent Application No. 201310153320.6, with an English translation.

(Continued)

*Primary Examiner* — Roberto Velez
*Assistant Examiner* — Yih-Sien Kao
(74) *Attorney, Agent, or Firm* — Fitzpatrick, Cella, Harper & Scinto

(57) ABSTRACT

An image processing apparatus for processing image signals that are obtained from an image pickup element. A correlation operation unit operates a correlation of the image signals of two images that are obtained from the image pickup element, and operates an image shift amount between images that are picked up by photoelectric conversion units, on the basis of the correlation. A detection unit detects whether or not an image signal reaches a predetermined level, and produces count information in a case that the image signal reaches the predetermined level. A controller controls the correlation operation unit, in which the controller normalizes the correlation that is used for the operation of the image shift amount, on the basis of the count information.

21 Claims, 12 Drawing Sheets

(56) References Cited

U.S. PATENT DOCUMENTS

| | | |
|---|---|---|
| 8,582,019 B2 | 11/2013 | Fujii et al. |
| 8,605,179 B2 | 12/2013 | Noguchi et al. |
| 8,611,424 B2 | 12/2013 | Kurata |
| 8,687,048 B2 | 4/2014 | Morifuji |
| 2005/0068435 A1 | 3/2005 | Shigemori et al. |
| 2007/0269127 A1* | 11/2007 | Kusaka ................ G06K 9/6202 382/255 |
| 2012/0162439 A1* | 6/2012 | Deng ................... H04N 7/0115 348/180 |
| 2013/0076931 A1* | 3/2013 | Border ............... G02B 27/0075 348/222.1 |

FOREIGN PATENT DOCUMENTS

| | | |
|---|---|---|
| CN | 102197328 A | 9/2011 |
| CN | 102245078 A | 11/2011 |
| CN | 102326396 A | 1/2012 |
| EP | 1 085 751 A2 | 3/2001 |
| EP | 1085751 A2 | 3/2001 |
| JP | H02-123313 A | 5/1990 |
| JP | 2001-083407 A | 3/2001 |
| JP | 2012-027390 A | 2/2012 |
| JP | 2012-042597 A | 3/2012 |

OTHER PUBLICATIONS

Japanese Office Action dated Mar. 1, 2016, issued in corresponding Japanese Patent Application No. 2012-102880.

\* cited by examiner

IMAGE PROCESSING APPARATUS, IMAGE PICKUP APPARATUS HAVING THE SAME, AND IMAGE PROCESSING METHOD

CLAIM OF PRIORITY

This application is a divisional application of copending U.S. patent application Ser. No. 13/859,174, filed Apr. 9, 2013, and published as U.S. Patent Application Publication No. 2013/0286275 on Oct. 21, 2013.

This application also claims the benefit of Japanese Patent Application No. 2012-102880, filed on Apr. 27, 2012, which is hereby incorporated by reference herein in its entirety.

BACKGROUND OF THE INVENTION

Field of the Invention

The present invention relates to an image processing apparatus and, more particularly, to an image processing apparatus for performing a focus detection using a phase difference between two obtained pupil-divided images.

Description of the Related Art

In the related art, such a technique that pupil-divided images are obtained by an image pickup element in which a plurality of photoelectric conversion units correspond to one microlens, and a phase difference between the two obtained pupil-divided images is obtained, to perform a focus detection has been known.

For example, Japanese Patent Application Laid-Open No. 2001-83407 discloses such a technique that a phase difference is obtained from pupil-divided images, to perform a focus detection, and at the same time, all signals of photoelectric conversion units corresponding to a same microlens are added together and output as a signal of one pixel. Japanese Patent Application Laid-Open No. 2001-83407 discloses such a technique that by handling the image signals in a manner similar to that mentioned in the latter technique, the image signals are made substantially identical to the image signals obtained by an array of image pickup pixels in the related art and an image for appreciation is formed by an image processing technique in the conventional art.

If any one of the divided photoelectric conversion units has reached a saturation, even when the outputs of all of the photoelectric conversion units corresponding to the same microlens are added up, an added output does not exhibit a linear characteristic due to an influence of the saturation, so that a picture quality deteriorates.

However, according to the related art disclosed in the above Patent Literature, although a permissible saturation level in an image which is finally obtained is improved and the picture quality is improved, a saturation level of a pupil-separated image before the addition is not improved. Rather than that, a deterioration of an image shape is caused by an influence of the pixel which absorbed charge leaked out from a saturated pixel, and a correlation of images at the time of obtaining a phase difference deteriorates.

That is, an adverse influence occurs in the focus detection, and then a focus detection precision deteriorates or the apparatus enters a state where the focus detection is impossible.

Since it may be resulted in that the focus detection is impossible while a good image has been obtained, such a situation that a state where the focus detection can be performed and a state where the focus detection is impossible cannot be distinguished appears, and this may confuse the user.

SUMMARY OF THE INVENTION

It is an aspect of the invention to provide an image processing apparatus and an image processing method which can attain to correctly obtain an image shift amount even in the case where a deterioration of an image shape due to saturation occurred in pupil-divided images.

To accomplish the above aspect of the invention, an image processing apparatus of the invention for processing image signals which are obtained from an image pickup element, comprises: a correlation operation unit configured to operate a correlation of the image signals of two images which are obtained from the image pickup element and operate an image shift amount between images picked-up by photoelectric conversion units on the basis of the correlation; a saturation detection unit configured to detect whether or not the image signal reaches a saturation level; and a controller configured to control the correlation operation unit, wherein the controller controls whether or not the correlation of the image signals from a plurality of photoelectric conversion units including the above-described photoelectric conversion units is used for the operation of the image shift amount which is performed by the correlation operation unit, and the control by the controller is made in accordance with a result of the saturation detection of the photoelectric conversion unit which is performed by the saturation detection unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Exemplary embodiments of the invention will be described in detail hereinbelow with reference to the drawings.

First, a construction of an image pickup apparatus according to the embodiment of the invention will be described.

Figure 1:
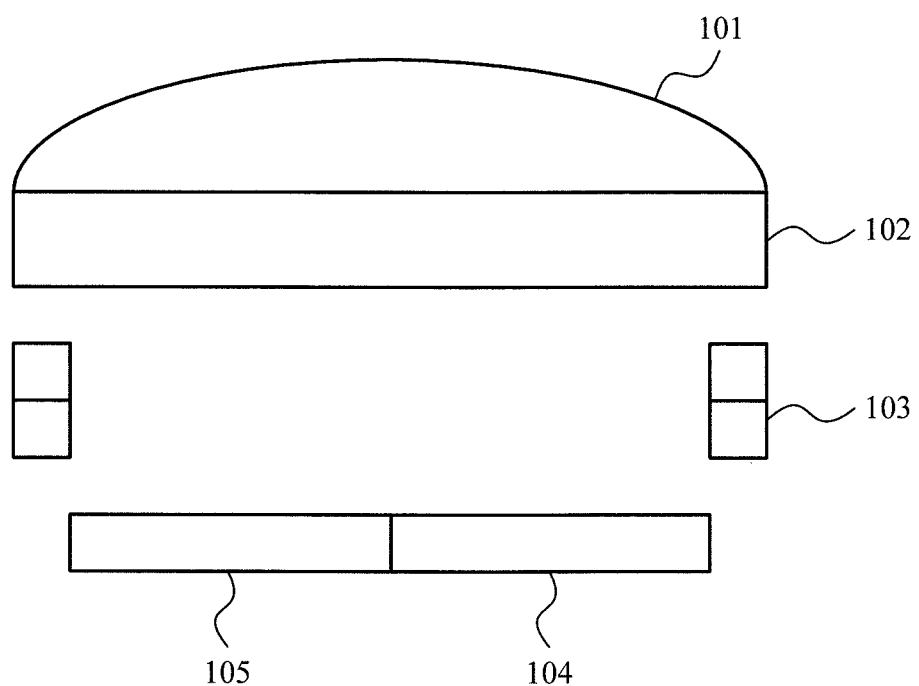
FIG. 1 is a diagram illustrating a pixel structure of an image pickup element according to an embodiment of the invention.

FIG. 1 is a diagram illustrating a structure of a pixel of an image pickup element according to the embodiment of the invention.

In the diagram, a microlens 101 for converging light onto the pixel is provided and a color filter 102 is a filter generally constructed in such a manner that respective color filters of a plurality of colors such as RGB or the like are arranged at a predetermined period.

A wiring layer 103 of a semiconductor and photodiodes 104 and 105 for performing a photoelectric conversion are provided.

Although the photodiodes 104 and 105 are provided as one photoelectric conversion unit in the ordinary image pickup element, in a pixel structure serving as a prerequisite of the invention, pupil-divided images are obtained by dividing the photoelectric conversion unit. That is, in that pixel structure, two photoelectric conversion units correspond to one microlens.

In an image (image A) formed by a photoelectric conversion signal (image signal) only from the photoelectric conversion unit 104 and an image (image B) formed by an image signal only from the photoelectric conversion unit 105, a parallax occurs in both of those images since a pupil has been divided. The images having the parallax therebetween can be used in a field where a focus detection is performed, a stereo image is obtained, or the like.

Since a same pupil shape as that of a general pixel is re-formed by adding the image signal of the photoelectric conversion unit 105 (B-image pixel) and the image signal of the photoelectric conversion unit 104 (A-image pixel), if a general signal processing is executed to the added image signal, an image similar to that in the image pickup element in the conventional art can be obtained.

The problem of the saturation of the photoelectric conversion units will now be described with reference to FIGS. 2A and 2B.

Figure 2A:
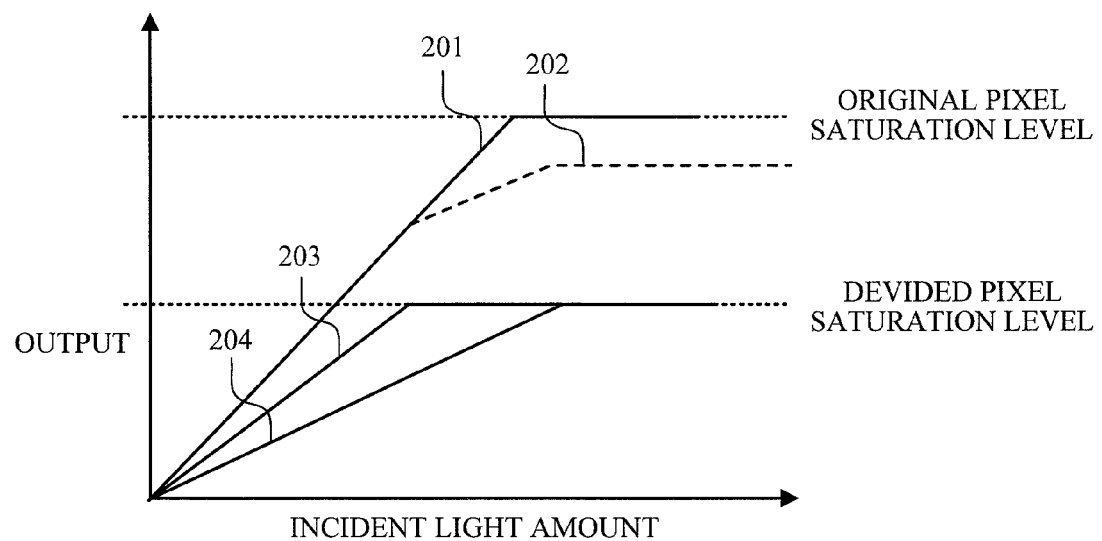
FIGS. 2A and 2B are diagrams illustrating incident light amount-output level characteristics in the pixel of FIG. 1.
Figure 2B:
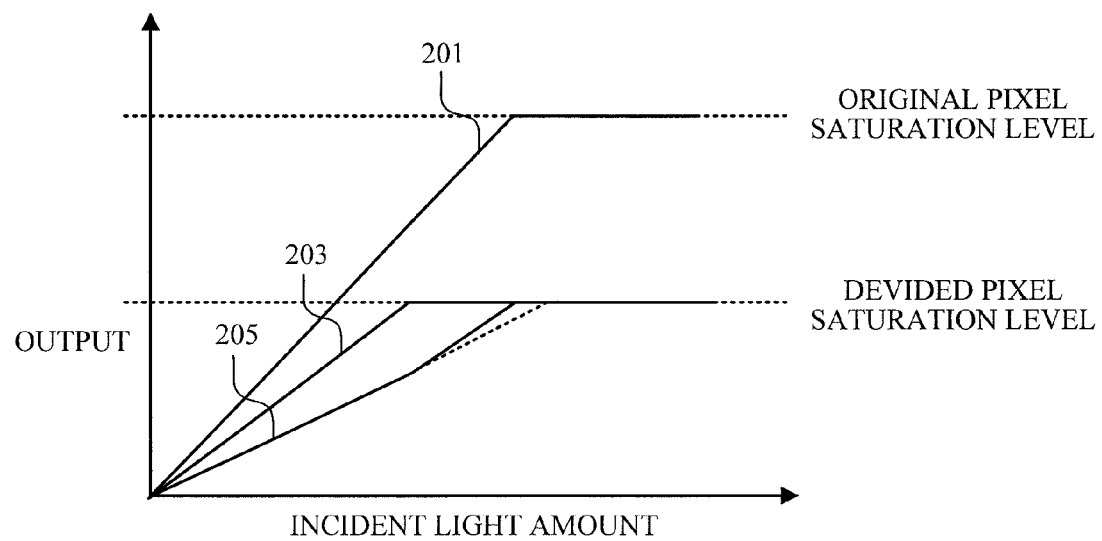

FIGS. 2A and 2B are diagrams illustrating a relation between incident light and an output in one pixel in which the photoelectric conversion unit is divided. An axis of abscissa indicates an amount of light which enters the microlens and an axis of ordinate indicates a value of the image signal which is output from the photoelectric conversion unit.

FIG. 2A illustrates the relation between the incident light and the output of the pixel in FIG. 1. A zigzag line 201 indicates a characteristic in the case where the photoelectric conversion unit is not divided, and a linearity is held until the output reaches a saturation level. If the light which enters the microlens is uniformly irradiated to the divided photoelectric conversion units, the image signal obtained by adding the image signals of the photoelectric conversion units show the characteristic 201 as illustrated in the diagram.

However, the light which is irradiated to the pixel is not uniform in a photosensitive surface thereof unless the pixel is positioned at the center of image height and is in an in-focus state.

Figure 9:
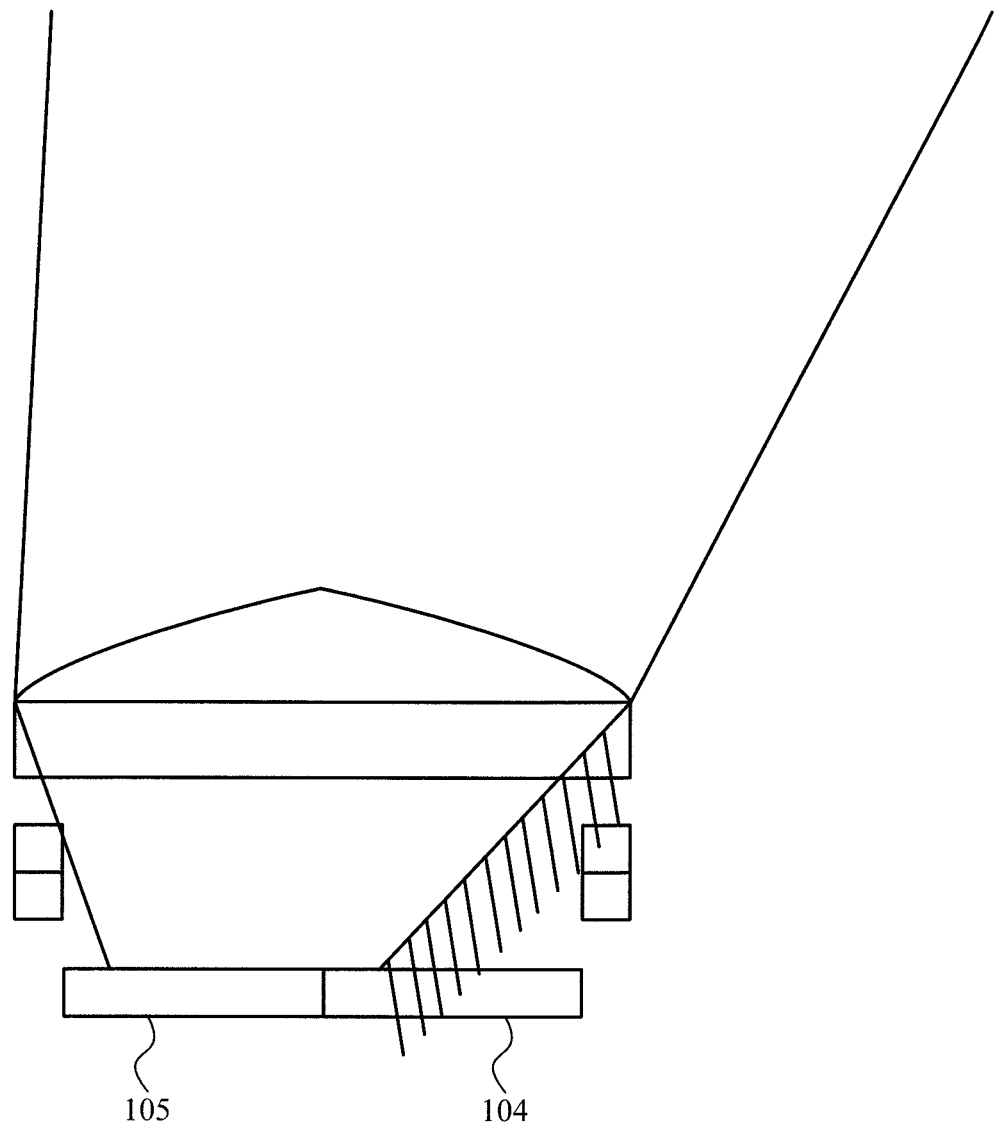
FIG. 9 is a diagram schematically illustrating incident light into a pixel of a high image height.

FIG. 9 illustrates a state where the light is irradiated to a pixel positioned at a high image height, that is, to a peripheral pixel of a display screen. In the peripheral pixel of the display screen, since the light enters from the oblique direction, the light is hardly received by the photoelectric conversion unit 104 and most of the light is received by the photoelectric conversion unit 105. Therefore, the photoelectric conversion unit 105 reaches the saturation first.

A zigzag line 203 in FIG. 2A indicates a characteristic of the photoelectric conversion unit 105 and a zigzag line 204 indicates a characteristic of the photoelectric conversion unit 104. Since the characteristic 203 reaches the saturation level first, the signal obtained by adding the image signals of the photoelectric conversion units 105 and 104 shows a zigzag line 202 and an influence of the saturation appears earlier than the characteristic 201.

As a countermeasure for avoiding such an influence, there is a method of using the following pixel structure.

That is, the pixel is constructed such that if the photoelectric conversion unit 105 reaches the saturation, the charge generated there leaks into the photoelectric conversion unit 104. Thus, the signal obtained by adding the image signals of the photoelectric conversion units 105 and 104 exhibits the characteristic as shown by the zigzag line 201 in FIG. 2B. In this case, the pixel 104 exhibits a characteristic as shown by a zigzag line 205 in FIG. 2B.

According to the curve 205, since the photoelectric conversion unit 105 (characteristic 203) reaches the saturation and the charge therefrom flows into the photoelectric conversion unit 104, an inclination of the output to the incident light rises in the zigzag line 205.

Further, since there exists a parallax between the images A and B in accordance with a defocus amount, their levels differ largely in a blurred (defocused) image. However, since the saturated charge leaks, both of the images A and B are saturated in a highlight portion.

Figure 3:
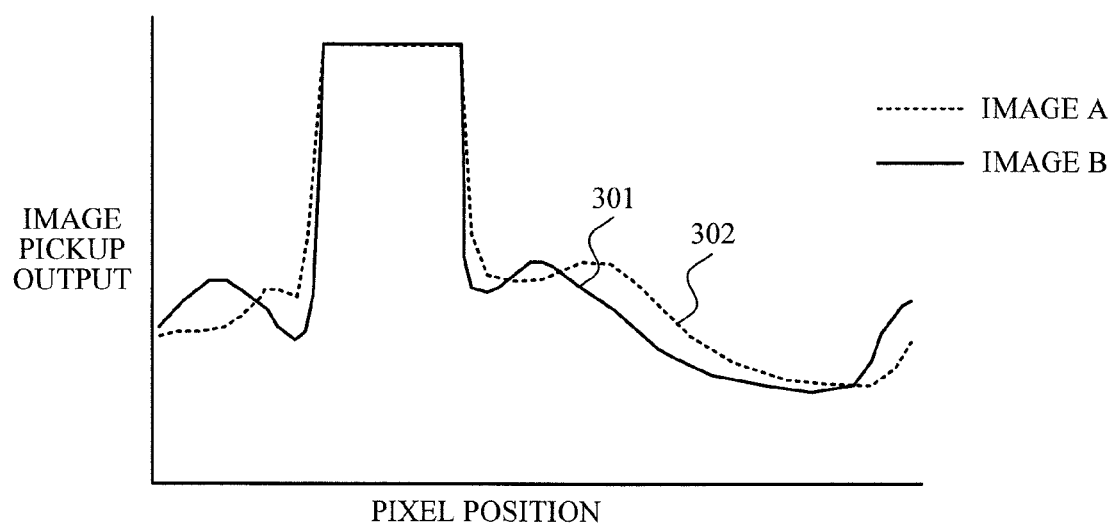
FIG. 3 is a diagram illustrating waveforms of image pickup outputs of a pixel of the image pickup element according to the embodiment of the invention.

FIG. 3 illustrates an example of the image signal in the case where a saturation occurred in a part of each of the defocused images A and B. In the diagram, a solid line 301 illustrates a waveform of the image B and a broken line 302 illustrates a waveform of the image A.

A defocus amount can be calculated by multiplying an image shift amount between the images A and B by a constant which is determined by a base line length. Since there is the image shift between the images A and B, the defocus amount is to be obtained. However, the image is not deviated in the portion where the saturation occurrs. Since an influence degree in this instance is large, a coincidence degree is largest at the foregoing position where no image shift occurs between the images A and B.

That is, since it is determined as a result of the correlation operation that no image shift occurs between the images A and B, it is erroneously decided that the pixel is in an in-focus state.

Figure 4:
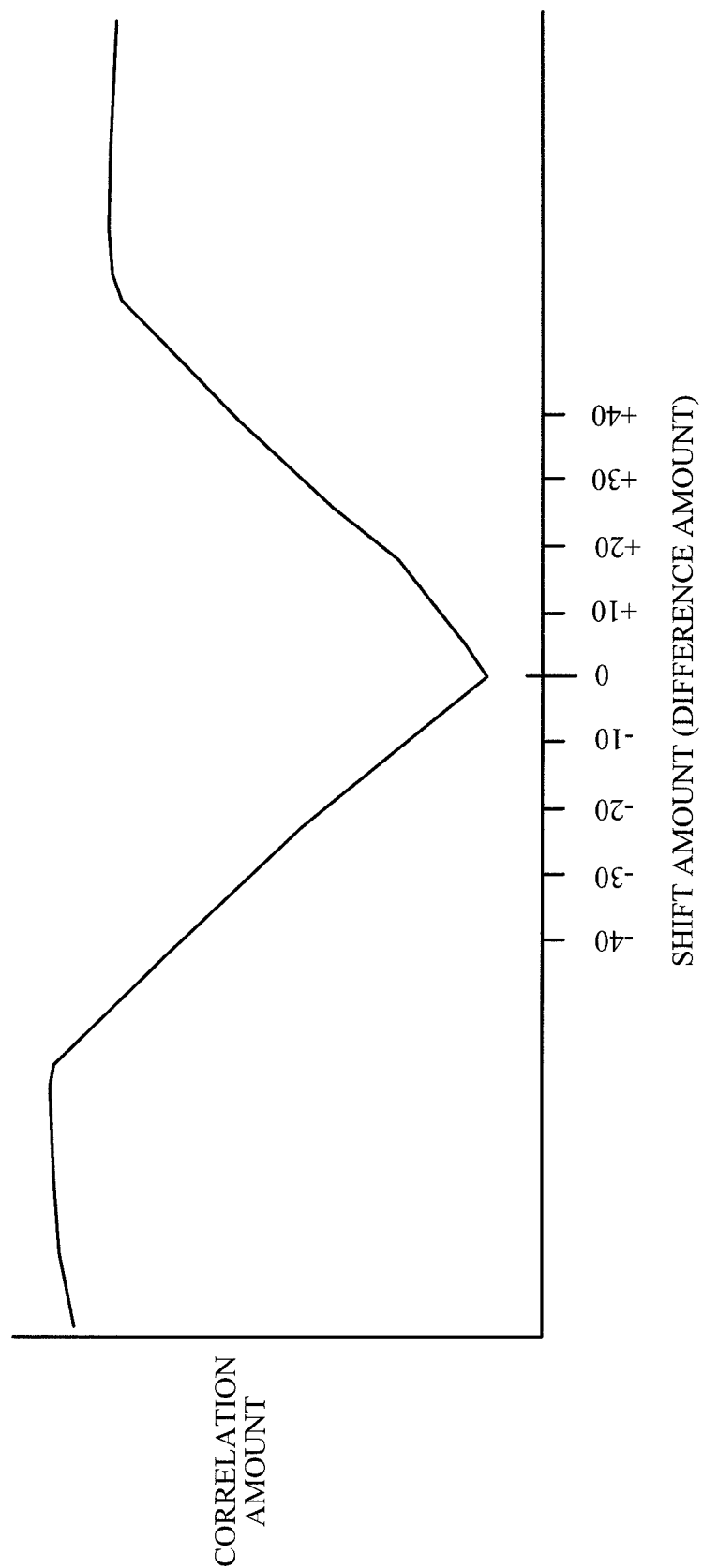
FIG. 4 is a diagram illustrating a correlation image which is obtained from the image pickup output waveforms illustrated in FIG. 3.

FIG. 4 illustrates a correlation image which is obtained by correlation operating the image signal 302 of the image A and the image signal 301 of the image B.

The correlation image is an image in which the images A and B are shifted little by little and a correlation amount obtained in accordance with a shift amount is set to an image. As a correlation amount, generally, a sum of the absolute values of the differences called SAD (Sum of Absolute Difference), a sum of the squares of the absolute values of the differences called SSD (Sum of Squared Difference), or the like is used as in index.

A position of a scale 0 at an axis of abscissa in FIG. 4 is a portion of the shift amount 0 and the correlation amount is smallest. A position of the smallest correlation amount is a portion of the high correlation. In the example of FIG. 4, a coincidence degree of the image in the portion of the shift amount 0 is largest.

As mentioned above, when the charge leak caused by the saturation occurs, such a phenomenon that the correlation amount is largely affected by the defocus amount 0 caused by the charge leak irrespective of an actual defocus amount occurs.

First Embodiment

A case where an image processing apparatus according to the first embodiment of the invention is applied to the image pickup apparatus having the image pickup element constructed by the pixel illustrated in FIG. 1 will be described hereinbelow with reference to FIG. 5.

Figure 5:
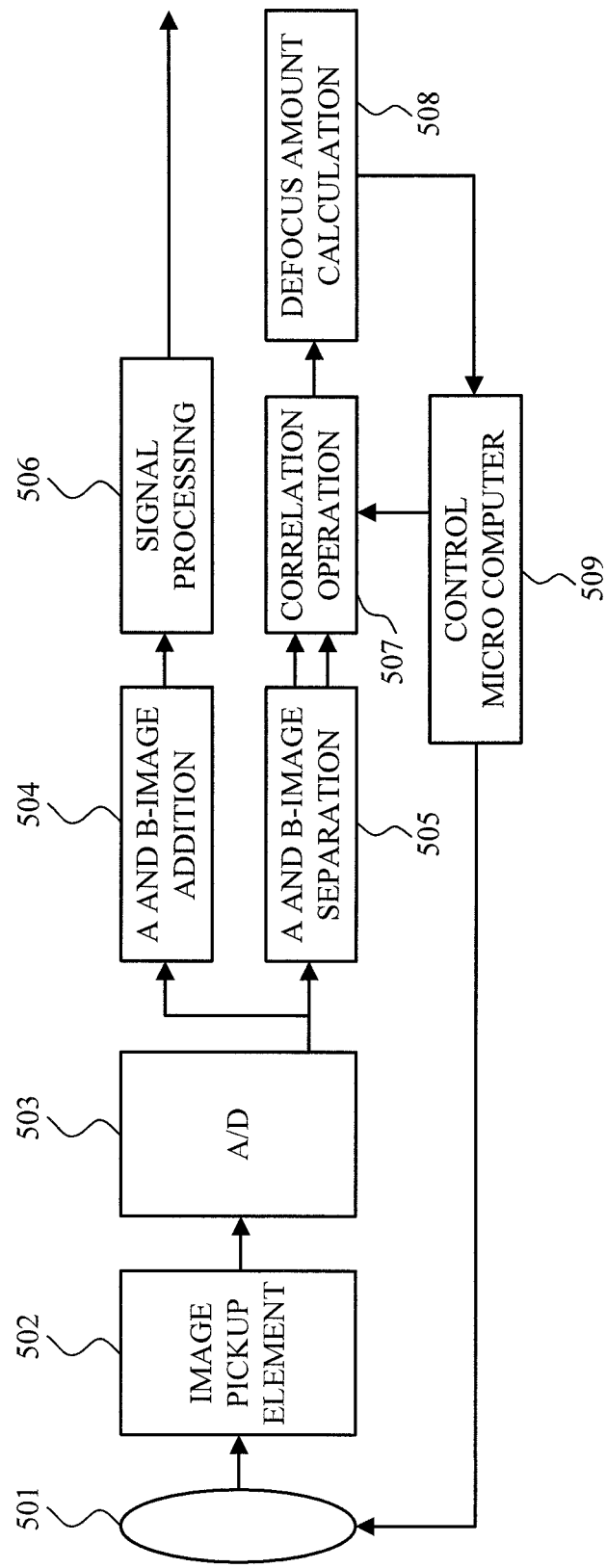
FIG. 5 is a block diagram of an image pickup apparatus according to the first embodiment of the invention.

FIG. 5 is a block diagram of the image pickup apparatus according to the first embodiment of the invention.

In the diagram, a lens 501, an image pickup element 502, an A/D converter 503, an A and B-image addition circuit 504, an A and B-image separation circuit 505, a signal processing circuit 506, a correlation operation circuit 507, and a defocus amount calculation unit 508 are provided. Those component elements are controlled by a micro computer 509 for controlling the whole system.

Figure 7:
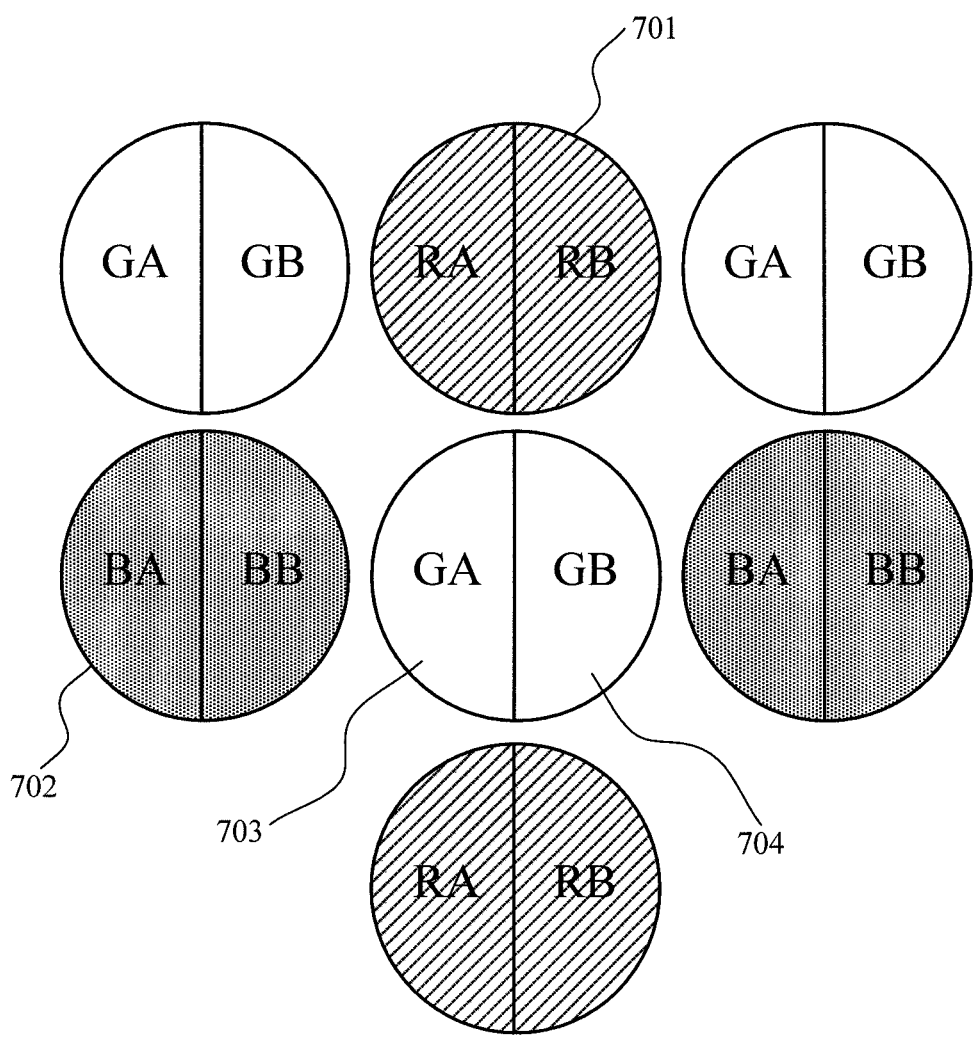
FIG. 7 is a diagram illustrating a pixel array of the image pickup element according to the embodiment of the invention.

A pixel of the image pickup element 502 has the structure as described by referring to FIG. 1. Two the photoelectric conversion units are provided for one microlens. FIG. 7 is a diagram illustrating a pixel array on the surface of the image pickup element. An A-image pixel 703 of green and a B-image pixel 704 of green are illustrated. Similarly, a B-image pixel 701 of red and an A-image pixel 702 of blue are illustrated.

As mentioned above, by forming one pixel by combining the A-image pixel and the B-image pixel, a Bayer array of RGB is obtained.

Since A-image data and B-image data are sequentially output from the A/D converter 503, if adjacent pixel data of the same color is added by the A and B-image addition circuit 504, the pixels are returned to the Bayer array.

The signal processing circuit 506 forms a color image signal from the Bayer array.

The A-image data and B-image data are separated by the A and B-image separation circuit 505 and transferred to the correlation operation unit 507.

A shift amount between the images A and B is calculated as a correlation image by the correlation operation unit 507 and output to the defocus amount calculation unit 508.

In the defocus amount calculation unit 508, an image shift amount is obtained by analyzing the correlation image and a + defocus amount is obtained by multiplying the image shift amount by a constant which is determined by the base line length of the images A and B. The control micro computer 509 controls the lens 501 in accordance with the defocus amount so as to obtain the in-focus state.

Figure 6:
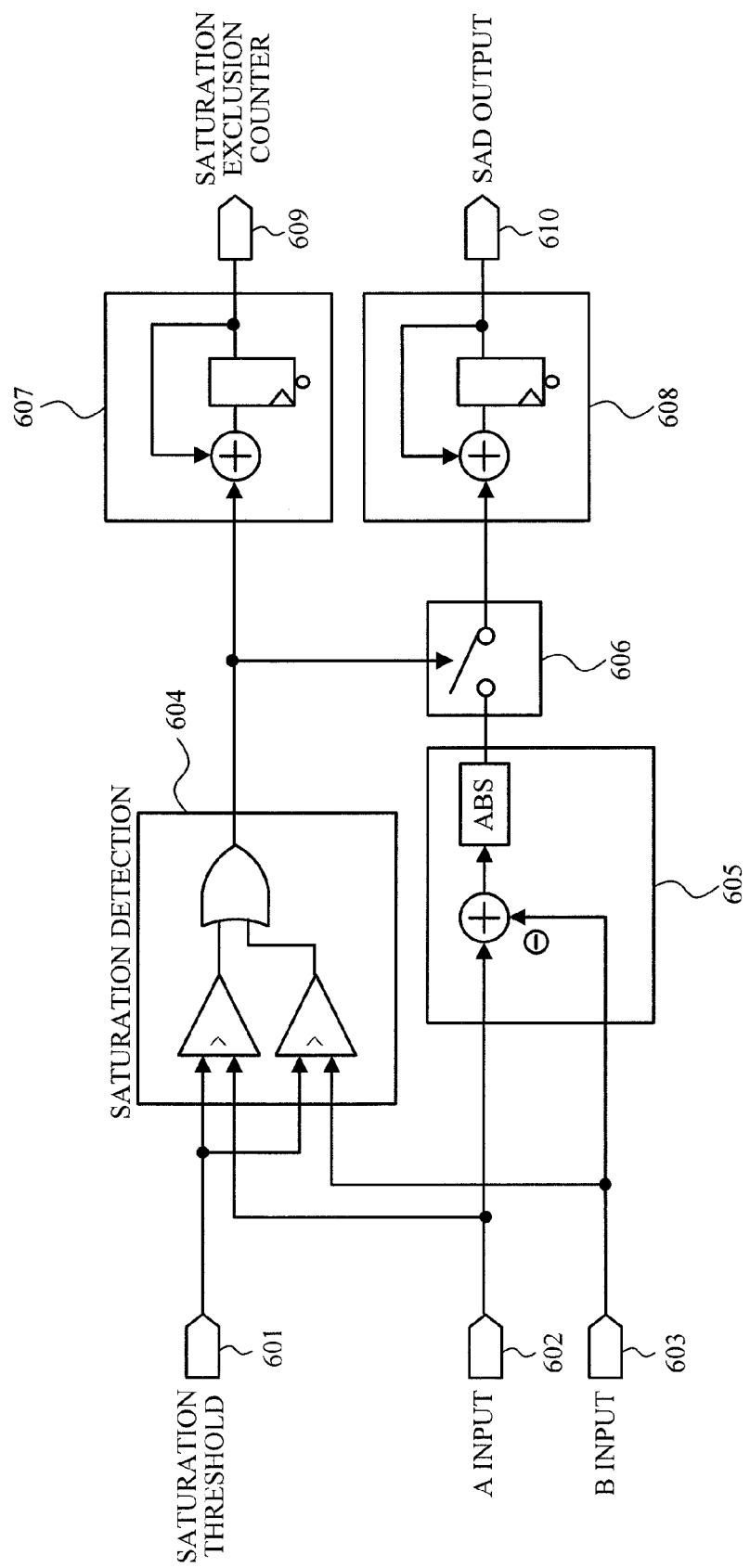
FIG. 6 is a constructional diagram of an absolute value adding-up circuit of a pixel difference value according to the first embodiment of the invention.

FIG. 6 is a circuit diagram of an absolute value adding-up unit constructing the correlation operation unit 507.

A saturation threshold level 601 is a set value which is given so as to be changeable by the control micro computer 509. A level at which the saturation is started as a characteristic of a sensor is designated as a threshold value.

An A-image data input 602 and a B-image data input 603 are provided. The A-image data and the B-image data stored in a buffer at a front stage of the correlation operation unit are input to the input terminals 602 and 603 repeatedly while changing the shift amount one by one. An absolute value of a difference between the A-image data and the B-image data is calculated in a difference absolute value operation unit 605. A sum of the absolute values of the differences is obtained by an adding-up unit 608.

At a point of time when the inputs 602 and 603 of the A-image data and the B-image data have been finished for one shift amount, an SAD output (adding-up output) 610 is fetched at a post stage and the adding-up unit 608 is reset. The shift amount is changed and the A-image data and the B-image data are input from the beginning After the input of the image is finished, the SAD output 610 is fetched. By repeating the same operation as that mentioned above many times after that, a correlation image is obtained. In a saturation detection unit 604, which one of the A-image pixel and the B-image pixel reaches the saturation is detected by comparing with the threshold value 601.

When saturation detection unit 604 detects the saturation, a switch 606 is turned off. In a processing cycle in which the saturation is detected, the difference absolute value is not fetched into the adding-up unit 608. Thus, the influence of the saturation can be excluded from the correlation amount output 610. That is, whether or not the correlation of the image signals is used for the operation of the image shift amount can be controlled in accordance with a result of the saturation detection of the saturation detection unit 604.

In a counter circuit 607, a count value is incremented by one in a cycle in which the output of the saturation detection unit 604 is equal to 1. Thus, the number of times of saturation-caused exclusion (exclusion frequency) is counted by the counter circuit 607. A saturation-caused exclusion image can be obtained by fetching a saturation-caused exclusion counter value 609 in a cycle for fetching the output of the correlation amount of the SAD output 610.

Figure 8A:
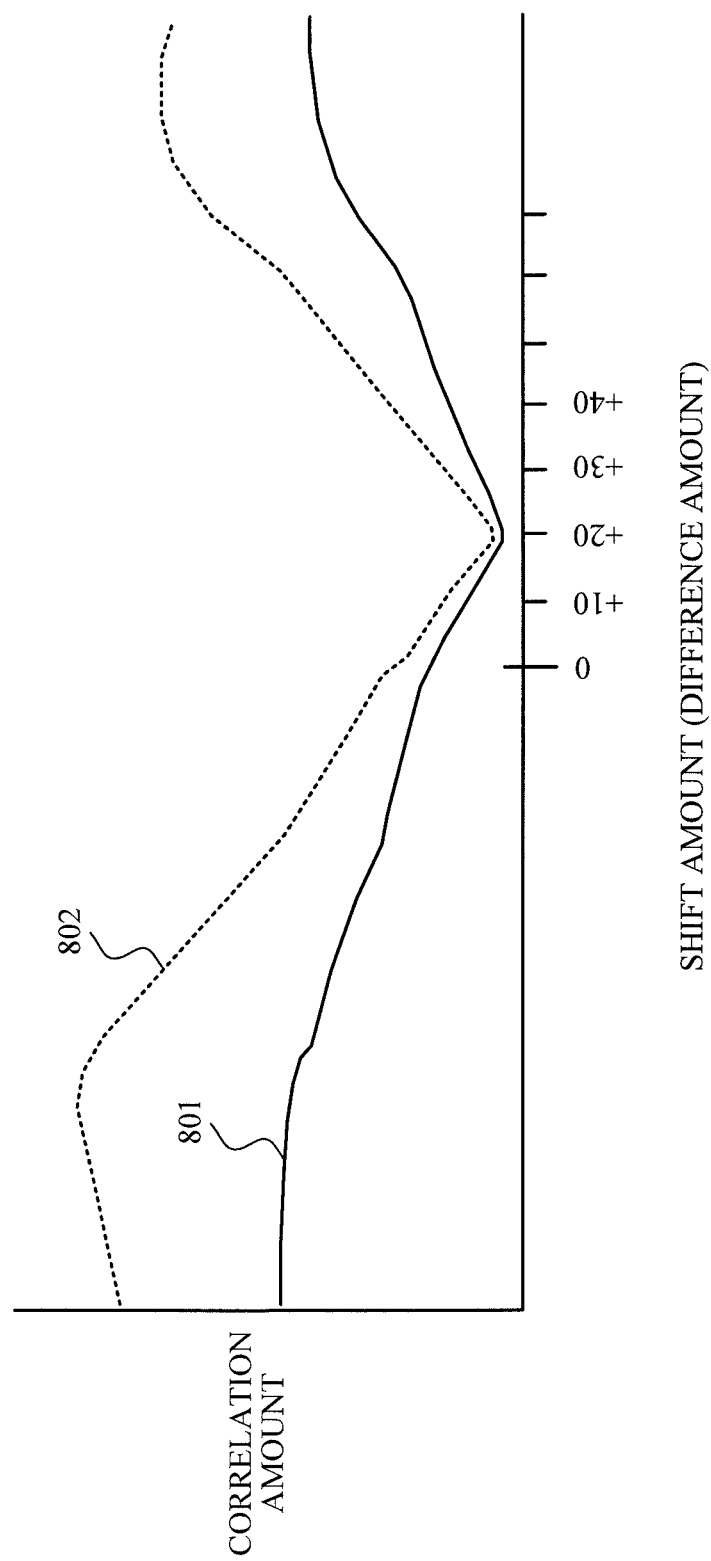
FIGS. 8A and 8B are diagrams illustrating a correlation image and an exclusion count image which are obtained from an output signal of the image pickup element of the pixel array illustrated in FIG. 7.

FIG. 8A illustrates a correlation image obtained in the correlation operation unit 507 on the basis of the output of the absolute value adding-up unit in FIG. 6.

In the diagram, a curve 801 indicates the correlation image according to the correlation amount added-up in the absolute value adding-up unit in FIG. 6.

Figure 8B:
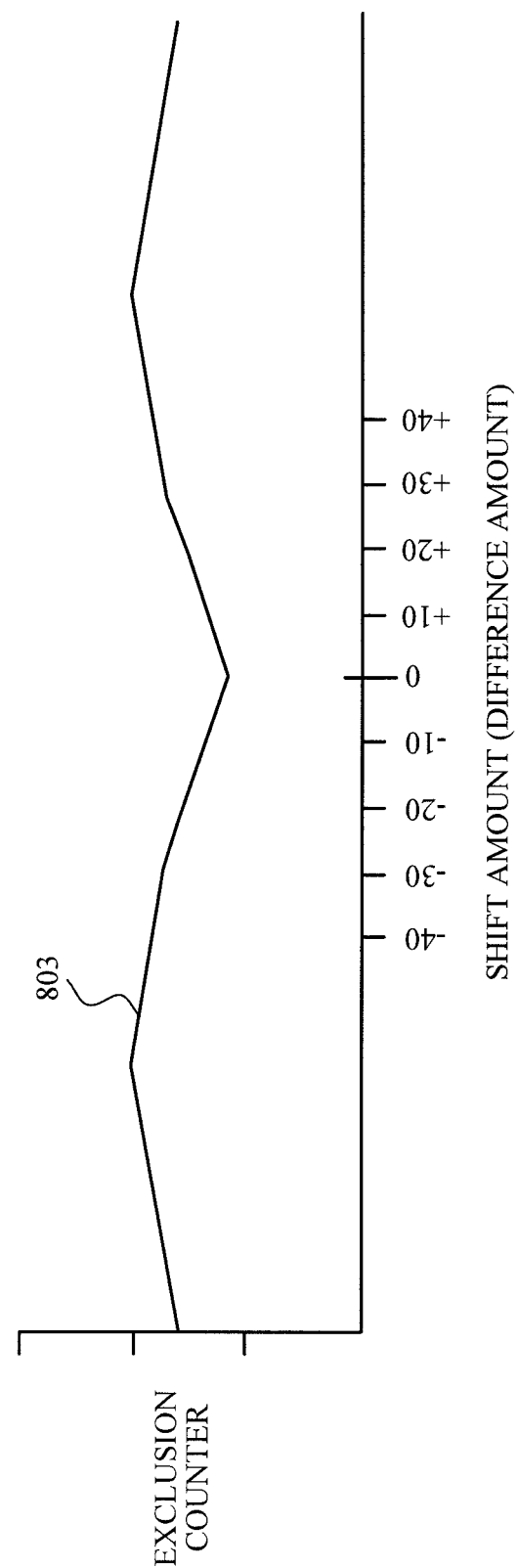

FIG. 8B illustrates a saturation-caused exclusion counter image corresponding to the correlation image. When the shift amount is equal to 0, a saturation area of the image A and a saturation area of the image B face to each other and the smallest saturation counter value is shown. A dotted line 802 indicates a normalized correlation image obtained by normalizing the correlation image 801 by a saturation-caused exclusion counter image 803. Specifically speaking, it is normalized by the following equation.

Normalized correlation amount=correlation amount*the number of field-of-view pixels/(the number of field-of-view pixels−saturation-caused exclusion counter value)

A weight is corrected by an amount in which the addition of the difference absolute value is excluded by the saturation.

The normalization is performed from the correlation image and the saturation-caused exclusion counter image by the defocus amount calculation unit 508, thereby obtaining the normalized correlation image as shown by the dotted line 802.

After that, in the defocus amount calculation unit 508, a sub-pixel matching is performed by a method called parabola fitting.

In the parabola fitting, since a sub-pixel matching position is calculated by using inclinations of the images before and after the minimum value of the correlation amount (for example, values at four points of the different shift amounts before and after the minimum value), a precision of the sub-pixel matching is improved by the normalization.

When a ratio occupied by the saturation pixels is large, unless the normalization is performed, the minimum value itself is disordered and the shift amount cannot be correctly calculated. Therefore, the correlation image is certainly normalized and used.

Second Embodiment

Subsequently, an image processing apparatus according to the second embodiment of the invention will be described with reference to FIGS. 10 and 11.

Although the correlation operation unit 507 is constructed by the operation unit and the like of the difference absolute value adding-up unit illustrated in FIG. 6 in the image processing apparatus according to the first embodiment, the function of the correlation operation circuit 507 is accomplished by a processing by the micro computer in the second embodiment. Although the processing by the micro computer in this case can be made by the control micro computer 509, a dedicated micro computer make take partial charge of the processing. The processing is accomplished by a method whereby the micro computer loads and executes a computer program stored in a memory (not shown). Since a construction other than the correlation operation circuit 507 is substantially the same as that illustrated in FIG. 5, its description is omitted here.

Figure 10:
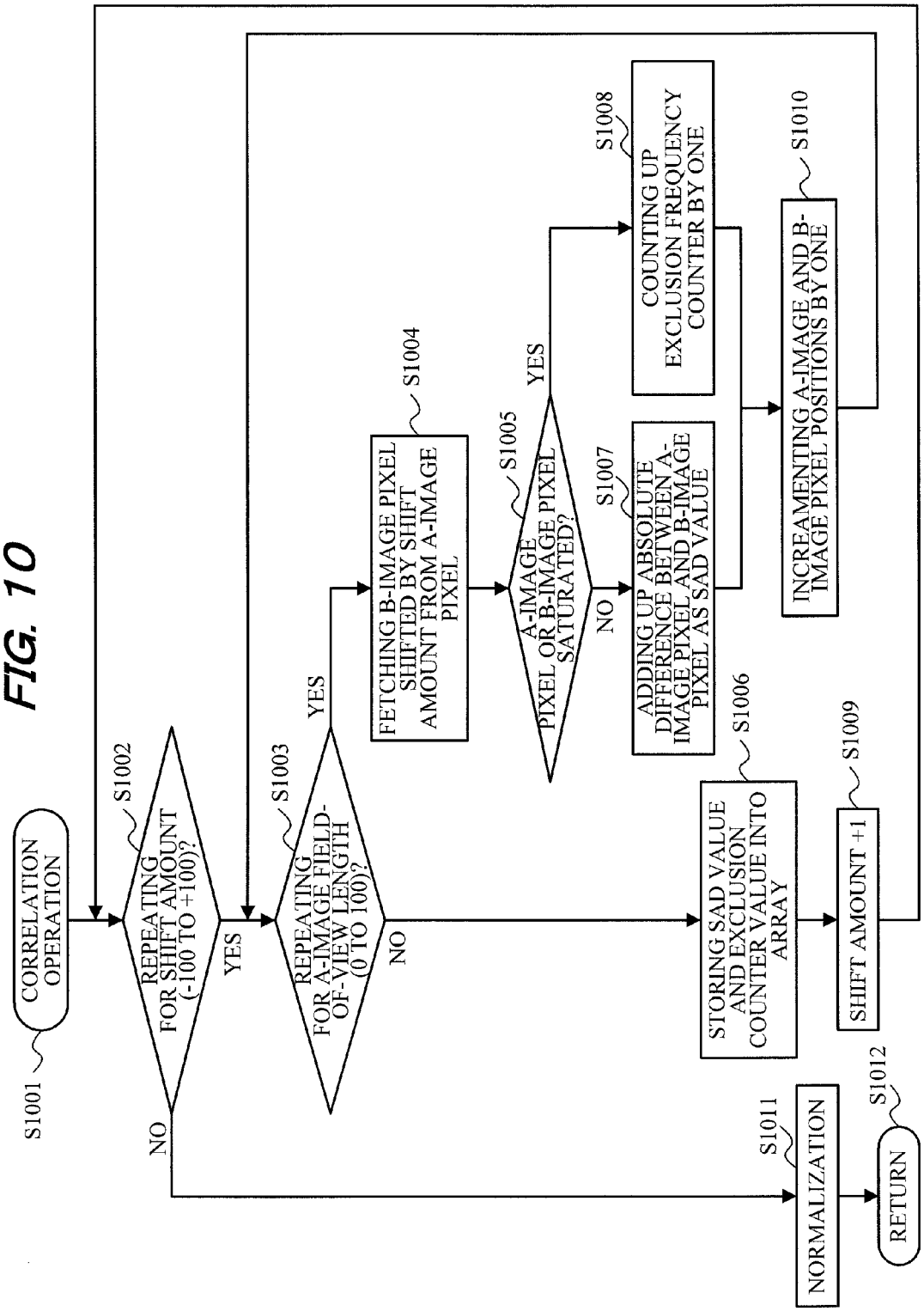
FIG. 10 is a flowchart for a correlation calculating operation according to the second embodiment of the invention.

FIG. 10 is a flowchart for the processing of the micro computer for realizing the function of the correlation operation unit 507 in the second embodiment.

First, when the correlation operation is started in step S1001, a repetition of the correlation amount adding-up operation is started for the shift amount (it is assumed to be −100 to +100) in step S1002.

A repetition for the number of pixels (field-of-view length) of the field-of-view of the image A is started in step S1003.

The pixels at the B-image pixel position shifted by the shift amount from the A-image pixel position are fetched in step S1004, respectively.

Whether or not the A-image pixel or the B-image pixel is saturated is discriminated in step S1005. If it is saturated, the processing routine advances to step S1008, the count value of the exclusion frequency counter is incremented, and step S1010 follows.

If each of the A-image pixel and the B-image pixel is not saturated in step S1005, step S1007 follows. The absolute value of the difference between the A-image pixel and the B-image pixel is added-up as an SAD value and step S1010 follows.

The pixel positions of the images A and B are incremented by one (+1) (shifted by a distance of one pixel) in step S1010 and the processing routine is returned to step S1003.

After steps S1003 to S1010 are repeated for the field-of-view length (N in step S1003), step S1006 follows and the SAD value and the exclusion counter value are stored in a position corresponding to the shift amount in the array.

The shift amount is incremented by one (+1) (shifted by a distance of one pixel) in step S1009 and the processing routine is returned to step S1002.

By repeating steps S1002 to S1009 for the shift amount, a table of the correlation image for each shift amount and the exclusion counter is formed (N in step S1002) and step S1011 follows.

The normalization operation is executed in step S1011 and this processing routine is finished in step S1012.

Figure 11:
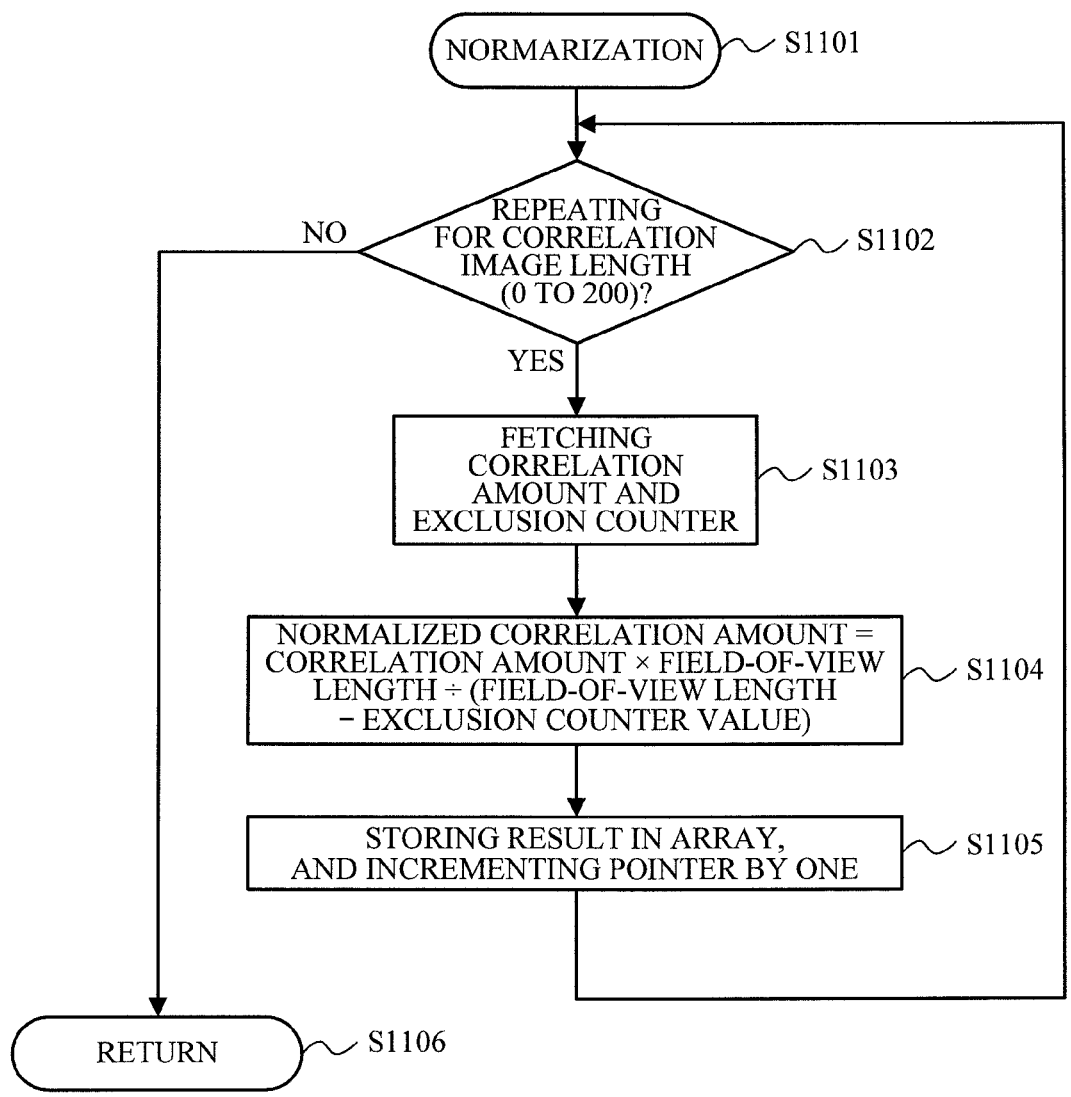
FIG. 11 is a flowchart for a correlation image normalization in the correlation calculating operation illustrated in FIG. 10.

FIG. 11 illustrates a detailed flowchart for the normalization operation in step S1011 in FIG. 10.

The normalization is started in step S1011.

A repetition for the correlation image length (0 to 200) is started in step S1102.

The correlation amount and the exclusion counter are fetched from the formed table in step S1103.

The normalization is performed by multiplying the correlation amount by (field-of-view length (field-of-view length−exclusion counter value)) in step S1104.

A result of the normalization operation is stored into the table and a pointer is advanced one by one in step S1105 and the processing routine is returned to step S1102.

After steps S1102 to S1105 are repeated for the field-of-view length (N in step S1102), step S1106 follows and the processing routine is returned to the processing routine in FIG. 10.

As mentioned above, a technical effect similar to that in the first embodiment can be also accomplished in the second embodiment. In the second embodiment, the functions of the processings shown in FIGS. 10 and 11 are realized by a method whereby the control micro computer 509 or the like reads out a program for realizing the functions of the processings as mentioned above from a memory (not shown) and executes it.

However, the invention is not limited to the foregoing construction but all or a part of the functions of the processings shown in FIGS. 10 and 11 may be realized by dedicated hardware. The foregoing memory may be constructed by a computer-readable and writable storage medium. For example, a magnetooptic disk apparatus, a non-volatile memory such as a flash memory or the like, a read-only storage medium such as a CD-ROM or the like, a volatile memory other than a RAM, or a combination of them may be used as a storage medium.

The foregoing processings may be executed by a method whereby the program for realizing the functions of the processings shown in FIGS. 10 and 11 is recorded into a computer-readable storage medium and the program recorded in the storage medium is read out and implemented into a computer system and is executed. It is assumed that "computer system" mentioned here incorporates the OS and hardware such as a peripheral device and the like. Specifically speaking, it incorporates a case where the program read out of the storage medium is written into a memory provided for a function expansion board inserted in the computer or a function expansion unit connected to the computer. In this case, after the program was written, a CPU or the like provided for the function expansion board or the function expansion unit executes a part or all of the actual processings on the basis of instructions of the program, and the functions of the embodiments mentioned above are realized by those processings.

"computer-readable storage medium" denotes a storage device such as flexible disk, magnetooptic disk, portable medium such as ROM, CD-ROM, or the like, hard disk which is built in the computer system, or the like. Further, it is assumed that "computer-readable storage medium" also incorporates a volatile memory (RAM) in the computer system serving as a server or a client in the case where the program has been transmitted through a network such as Internet or the like or a communication line such as a telephone line or the like. As mentioned above, the memory in which the program is held for a predetermined time is also incorporated in "computer-readable storage medium".

The program may be transmitted from the computer system in which the program has been stored in the storage device or the like to another computer system through a transmission medium or by a transmission wave in the transmission medium. "transmission medium" for transmitting the program denotes a medium having a function for transmitting information like a network (communication network) such as Internet or the like or a communication line (communication wire) such as a telephone line or the like.

The foregoing program may be a program for realizing a part of the functions mentioned above. Further, the program may be what is called a differential file (differential program) which can realize the foregoing functions by a combination with the program which has already been recorded in the computer system.

A program product such as a computer-readable storage medium or the like in which the foregoing program has been recorded can be also applied as an embodiment of the invention. The foregoing program, storage medium, transmission medium, and program product are incorporated in the purview of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

I claim:

1. An image processing apparatus for processing image signals that are obtained from an image pickup element, the image processing apparatus comprising:
   at least one memory and processor configured to function as:
   (a) a first detection unit configured to detect correlation data by operating a correlation of the image signals of two images that are obtained from the image pickup element;
   (b) a counting unit configured to detect, before the first detection unit operates the correlation of the image signals, whether or not an image signal reaches a predetermined level, and to produce count information that indicates a count at which the image signal reaches the predetermined level; and
   (c) a second detection unit configured to compose a plurality of the correlation data with each other, excluding the correlation data that is concerned with the image signal reaching the predetermined level and to normalize the correlation data composed by the second detection unit, on the basis of the count information, wherein the second detection unit detects a defocus amount on the basis of the correlation data normalized by the second detection unit.

2. The image processing apparatus according to claim 1, wherein the image pickup element is constructed such that a plurality of photoelectric conversion portions are arranged correspondingly to a microlens.

3. The image processing apparatus according to claim 1, wherein, when the two images are relatively shifted to operate the correlation by the first detection unit, if the predetermined level of an image signal is detected, the second detection unit does not use a signal that has reached the predetermined level and does not use a signal corresponding to the count information for the operation of the image shift amount.

4. The image processing apparatus according to claim 1, wherein the image signal reaching the predetermined level is not used by the first detection unit for detecting the correlation data.

5. The image processing apparatus according to claim 1, wherein the counting unit detects whether or not an image signal, of the two images, reaches the predetermined level, on the basis of a result of a comparison between (i) a level of the image signal and (ii) a preset threshold value that is set by the controller.

6. The image processing apparatus according claim 1, wherein the first detection unit detects the correlation data by shifting the two images relatively.

7. The image processing apparatus according to claim 4, wherein the first detection unit forms (i) a correlation image and (ii) an exclusion image corresponding thereto, from the correlation that is used for the operation of the image shift amount and the number of times of exclusion, and the second detection unit normalizes the correlation image on the basis of the exclusion image.

8. An image pickup apparatus comprising:
   (a) an image pickup element in which a plurality of photoelectric conversion portions are arranged in correspondence to a microlens; and
   (b) an image processing apparatus for processing image signals that are obtained from the image pickup element, the image processing apparatus including at least one memory and processor configured to function as:
   (i) a first detection unit configured to detect correlation data by operating a correlation of the image signals of two images that are obtained from the image pickup element;
   (ii) a counting unit configured to detect, before the first detection unit operates the correlation of the image signals, whether or not the image signal reaches a predetermined level, and to produce count information that indicates a count at which the image signal reaches the predetermined level; and
   (iii) a second detection unit configured to compose a plurality of the correlation data with each other, excluding the correlation data that is concerned with the image signal reaching the predetermined level, and to normalize the correlation data composed by the second detection unit on the basis of the count information, wherein the second detection unit detects a defocus amount on the basis of the correlation data normalized by the second detection unit.

9. The image pickup apparatus according to claim 8, further comprising:
   (c) an addition unit configured to add image signals from the plurality of photoelectric conversion portions to produce an added signal; and
   (d) a signal processing unit configured to process the added signal.

10. The image pickup apparatus according to claim 8, wherein, when the two images are relatively shifted to operate the correlation by the first detection unit, if the predetermined level of an image signal is detected, the second detection unit does not use the predetermined level of an image signal and a signal corresponding to the count information for the operation of the image shift amount.

11. The image pickup apparatus according to claim 8, wherein the image signal reaching the predetermined level is not used by the first detection unit for detecting the correlation data.

12. The image pickup apparatus according to claim 8, wherein the counting unit detects whether or not an image signal, of the two images, reaches the predetermined level, on the basis of a result of a comparison between (i) a level of the image signal and (ii) a preset threshold value that is set by the controller.

13. The image pickup apparatus according to claim 8, wherein the first detection unit detects the correlation data by shifting the two images relatively.

14. The image pickup apparatus according to claim 11, wherein the first detection unit forms (i) a correlation image and (ii) an exclusion image corresponding thereto, from the correlation that is used for the operation of the image shift amount and the number of times of exclusion, and the second detection unit normalizes the correlation image on the basis of the exclusion image.

15. An image processing method for processing image signals that are obtained from an image pickup element, the image processing method comprising:
 a first detection step of detecting correlation data by operating a correlation of the image signals of two images that are obtained from the image pickup element;
 a counting step of detecting, before the correlation of the image signals is operated in the first detection step, whether or not the image signal reaches a predetermined level, and producing count information that indicates a count at which the image signal reaches the predetermined level;
 a second detection step of composing a plurality of the correlation data with each other, excluding the correlation data that is concerned with the image signal reaching the predetermined level, and normalizing the correlation data composed in the second detection step on the basis of the count information; and
 a third detection step of detecting a defocus amount on the basis of the correlation data normalized in the second detection step.

16. The image pickup method according to claim 15, wherein the image pickup element is constructed such that a plurality of photoelectric conversion portions are arranged correspondingly to a microlens.

17. The image pickup method according to claim 15, wherein, when the two images are relatively shifted to operate the correlation in the first detection step, if the predetermined level of an image signal is detected, the second detection step does not use the predetermined level of an image signal and a signal corresponding to the count information for the operation of the image shift amount.

18. The image pickup method according to claim 15, wherein the image signal reaching the predetermined level is not used in the first detection step for detecting the correlation data.

19. The image pickup method according to claim 15, wherein the counting step comprises detecting whether or not an image signal, of the two images, reaches the predetermined level, on the basis of a result of a comparison between (i) a level of the image signal and (ii) a preset threshold value that is set in the control step.

20. The image processing method according to claim 15, wherein the correlation data is operated by shifting the two images relatively in the first detection step.

21. The image pickup method according to claim 18, wherein the first detection step forms (i) a correlation image and (ii) an exclusion image corresponding thereto, from the correlation that is used for the operation of the image shift amount and the number of times of exclusion, and the correlation image is normalized in the second detection step on the basis of the exclusion image.

* * * * *